United States Patent
Kovář et al.

(10) Patent No.: US 8,807,349 B2
(45) Date of Patent: Aug. 19, 2014

(54) DEVICE FOR GENERATION OF ION NETWORK FOR WATER TREATMENT IN TANKS

(76) Inventors: Josef Kovář, Praha (CZ); Petr Kovář, Praha (CZ)

(*) Notice: Subject to any disclaimer, the term of this patent is extended or adjusted under 35 U.S.C. 154(b) by 481 days.

(21) Appl. No.: 12/769,933

(22) Filed: Apr. 29, 2010

(65) Prior Publication Data

US 2010/0276348 A1    Nov. 4, 2010

(30) Foreign Application Priority Data

Apr. 29, 2009   (CZ) .................................... 2009-272

(51) Int. Cl.
    *C02F 1/30*    (2006.01)
    *C02F 1/46*    (2006.01)

(52) U.S. Cl.
    USPC ........ 210/464; 205/615; 205/742; 250/432 R; 250/435; 204/660; 210/242.1

(58) Field of Classification Search
    USPC ............... 210/748.01, 748.08, 748.09, 748.1, 210/748.17, 764, 170.05, 242.1, 748.19, 210/205; 205/464, 556, 615, 742; 440/39; 250/432 R, 433, 435, 436, 437, 438; 204/660

See application file for complete search history.

(56) References Cited

U.S. PATENT DOCUMENTS

| | | | |
|---|---|---|---|
| 4,238,326 A | | 12/1980 | Wolf |
| 5,067,918 A | * | 11/1991 | Kobayashi ...................... 440/39 |
| 2002/0185452 A1 | * | 12/2002 | Johnson ......................... 210/748 |
| 2004/0099608 A1 | * | 5/2004 | Leffler et al. .................. 210/704 |
| 2005/0067300 A1 | * | 3/2005 | Tremblay ....................... 205/742 |

FOREIGN PATENT DOCUMENTS

| | | |
|---|---|---|
| CZ | 13729 | 9/2000 |
| CZ | 14307 | 4/2004 |
| DE | 19704747 | 8/1998 |
| WO | WO 95/06007 | 3/1995 |
| WO | WO 01/14258 | 3/2001 |
| WO | WO 02/26637 | 4/2002 |

* cited by examiner

*Primary Examiner* — Lucas Stelling
(74) *Attorney, Agent, or Firm* — Preti Flaherty Beliveau & Pachios LLP

(57) ABSTRACT

The invention concerns a device for generation of ion network for water treatment in tanks, especially for reduction of cloud and for stabilization of water surfaces, where the device is arranged on a floating body equipped with a drive for initiation of mutual motion of the floating body and water, whereas the floating body is equipped with an ejector and at least one source of electrolytically and/or photocatalytically treated water connected with an outlet (9) that leads into ejection and/or ejected water of an ejector.

Figure 1:
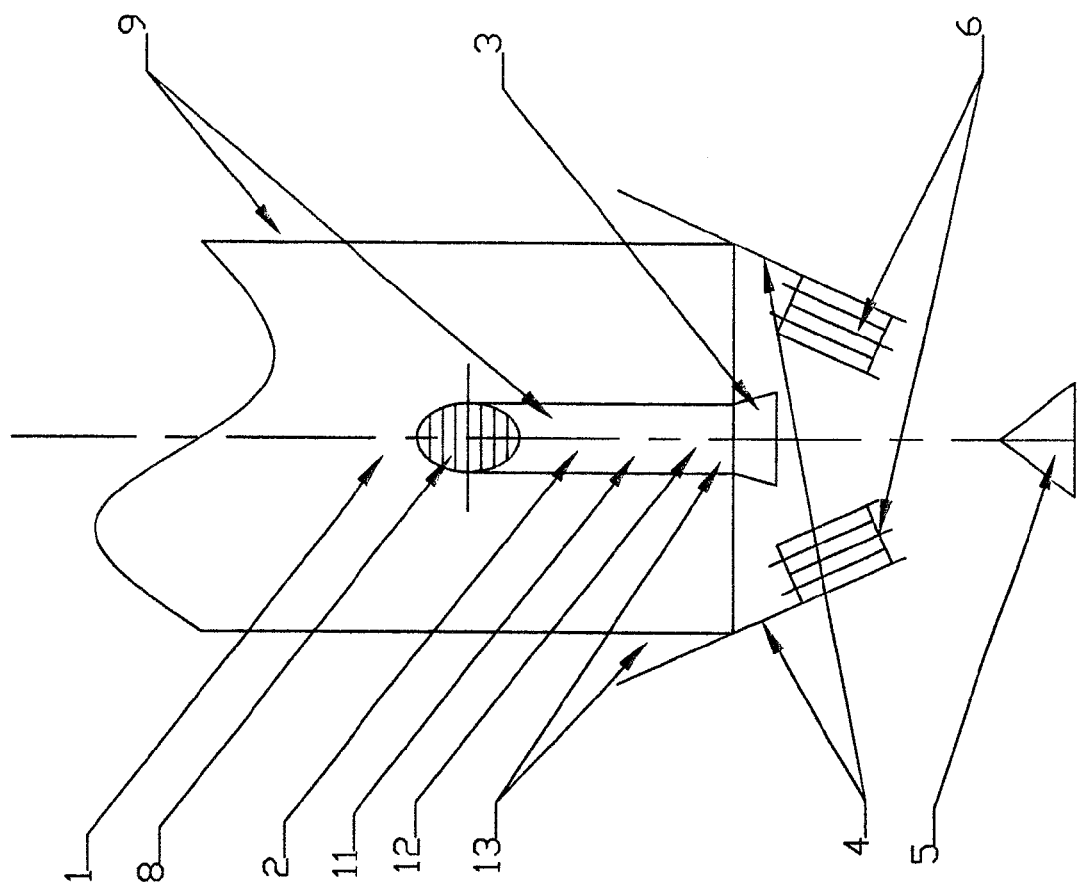

Eventually, an inlet of chemical agents (11) and/or an inlet of biological agents (12), an inlet of oxidation agent (13) or an inlet of air (14) lead into ejection and/or ejected water of the ejector.

9 Claims, 4 Drawing Sheets

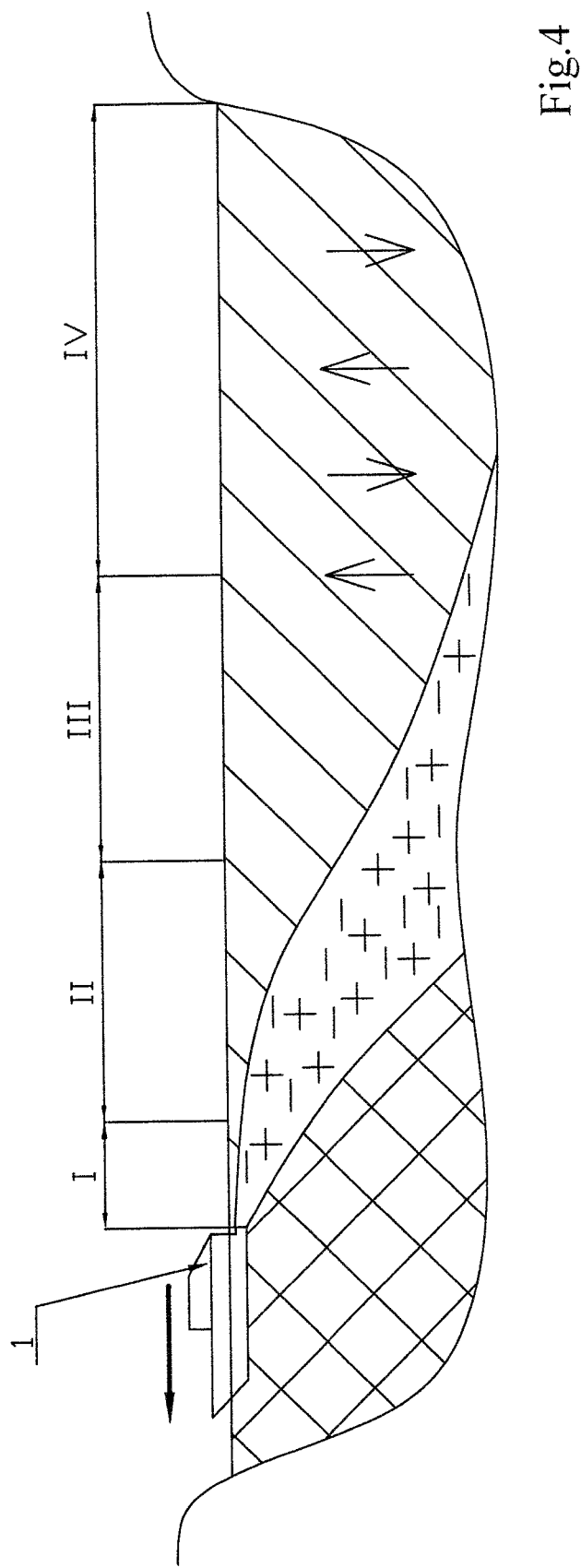

DEVICE FOR GENERATION OF ION NETWORK FOR WATER TREATMENT IN TANKS

TECHNICAL FIELD

The invention concerns a device for generation of ion network for water treatment in tanks, especially for reduction of cloud and for stabilization of water surfaces, where the device is arranged on a floating body equipped with a drive for initiation of mutual motion of the floating body and water, whereas the floating body is equipped with an ejector.

STATE-OF-THE-ART

When water surfaces are polluted with anabaena, plankton, seaweeds, crude oil etc., aquatic animals are endangered and, at the same time, water surface users are health-threat which comes out mostly in recreation resorts.

To remove pollution of water surfaces, basically two ways are used. One of the ways is dusting of water surfaces with correction preparations from dusters, the second one is dusting of water surfaces with correction preparations from water crafts.

Dusting from dusters is not profitable because of frequent scatter of correction preparations outside of water surfaces which leads both to environmental hazard outside these surfaces and it also increases largely the amount of correction preparations needed for effective removal of pollutants in water surfaces and thus the whole process goes up in price.

Dusting of correction preparations from water crafts is very time-consuming, the whole process is non-productive and it is realistic to apply it only on smaller water surfaces.

Other measures known are devices for application of correction preparations against pollution of water surfaces where the preparations are fed to a device arranged on a floating body. The device consists of a water jet fixed to the floating body and arranged with a propulsor at the end of a channel, whereas the correction preparation inlet pipeline leads into this channel or into the ejector surrounding the jet. In case of usage of such more effective preparations or media, a significantly better effect is achieved compared to the devices mentioned above.

Usage of ozone as one of possible media that is fed into the device with a jet and an ejector and which enables to eliminate the use of chemical agent is known as well.

The aim of this invention is a device for application of correction preparations or media which enables their more effective and better application and facilitates more forceable correction intervention.

SUBJECT MATTER OF AN INVENTION

According to this invention, the subject matter of the device for generation of ion network for water treatment in tanks lies in the fact that a floating body is equipped with at least one source of electrolytically and/or photocatalytically treated water connected with an outlet that leads into ejection and/or ejected water of an ejector. Electrolytically and/or photocatalytically treated water is a catholyte and/or an anolyte. There is an electrochemical and/or photocatalytical source arranged in the channel of the ejector jet and/or outside the jet. Alternatively, an ejector deflector can be arranged on sides of the jet, eventually an aerosol deflector can be arranged behind the jet.

An inlet of chemical agents and/or an inlet of biological agents and/or an inlet of an oxidation agent can eventually lead into ejection and/or ejected water of the ejector.

REVIEW OF FIGURES IN THE DRAWING

Figure 2:
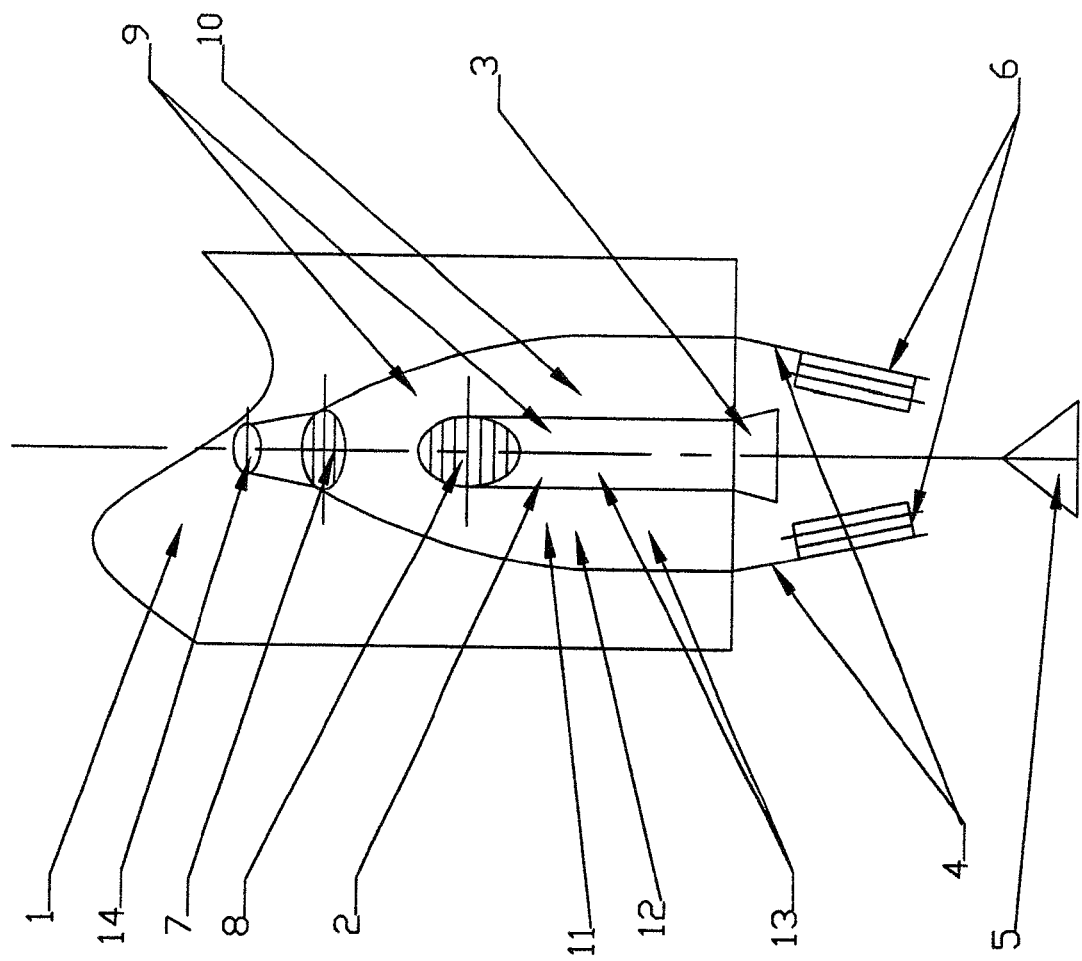
Figure 3:
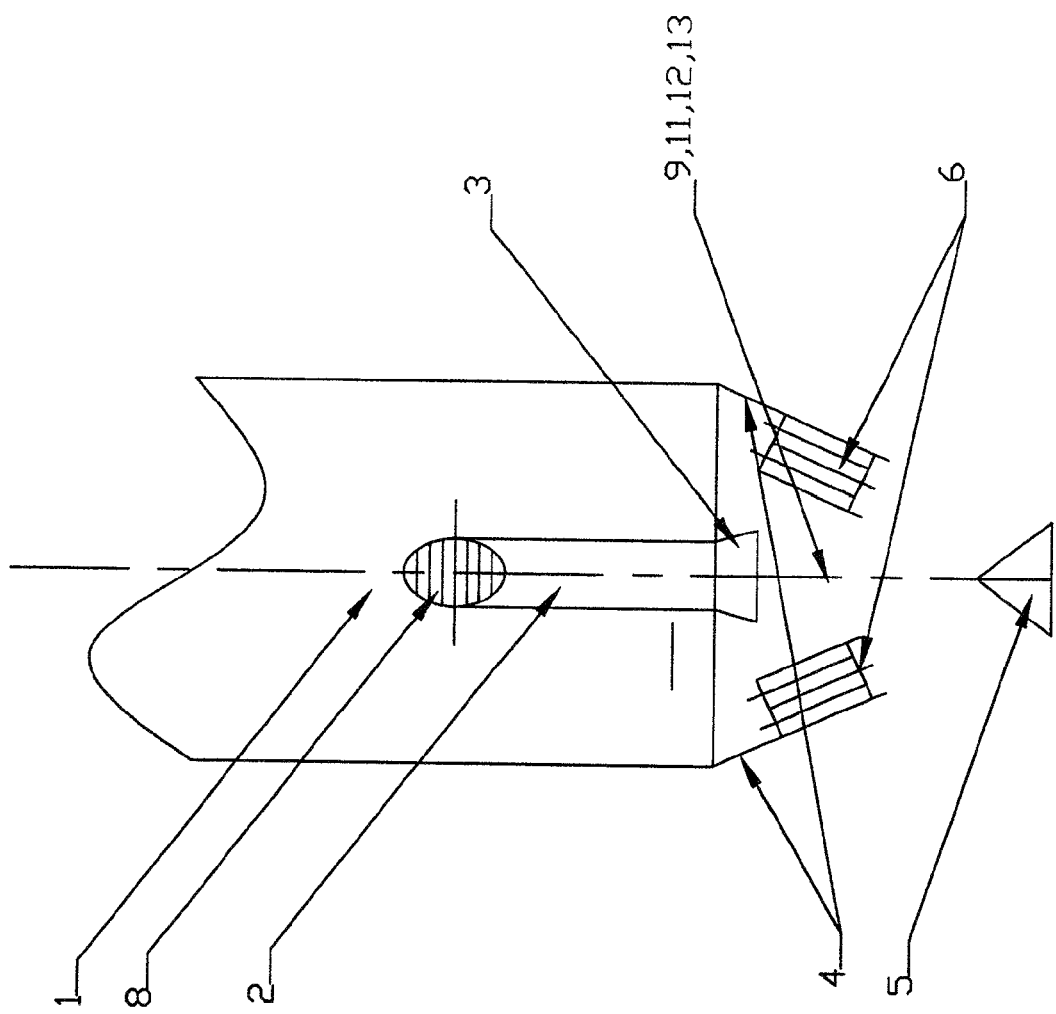

The device for generation of ion network for water treatment in tanks according to the invention is schematically plotted in the attached figures:

FIG. 1 One of possible embodiments
FIG. 2 Another of possible embodiments
FIG. 3 Another alternative embodiment and
FIG. 4 Schematic display of the ion network laying in a water tank

AN EXAMPLE OF AN EMBODIMENT OF THE INVENTION

As it is evident in FIG. 1, the jet 2 is arranged on the floating body 1 that can be, for example, a driven craft. The jet is a part of an ejector and in its channel there is a propulsor arranged which, eventually, serves for driving the craft. At the end of the jet 2 there is a shaped end 3 arranged at sides of which ejector deflectors 4 are arranged. Ejection water of higher speed flows through the jet 2 and it comes out into the area of the ejector with ejected water of lower speed where its pulling occurs. In the figures, the ejector deflectors 4 are shown oriented in the direction of water flowing towards the axis of the flow. This position of the deflectors 4 can be constrainedly adjustable, eventually the deflectors 4 are floating and thus they are self-aligning due to variable flowing of water. An aerosol deflector 5 can be eventually built in the axis of the jet 2. An arrow in the figure shows the direction of movement of the floating body 1.

Electrochemical sources 6 are fixed to inner sides of the ejector deflectors 4. In these sources, interaction between physical and chemical effects occurs the outflows of which are ions of electrolytically or electrodialytically (a kind of an electrolytically treated solution) or photocatalytically treated solution for creating the ion network. In case of the electrodialytically treated solution, the outflow from the electrochemical source is basically an alkalic solution—a catholyte for removal of dirtiness or disinfection, or basically an acid solution—an anolyte for coagulation (agglutination), eventually the outflow can be a neutral solution serving mostly for fighting against mildew, algae and viruses.

By an electrochemical source, a change of physico-chemical characteristics of water, eventually coagulation and/or a change of structural-energetical characteristics of water are achieved. Within the scope of the invention, it is essential that electrochemical sources work in synergy with an ejector.

The basic principle of this technology of the ion network creation is utilization of electrophysical and electrochemical impact on treated environment (water in a water tank) where forming of an electrochemical source of ions occurs and thus a controlled change of physico-chemical characteristics of water including affecting structural-energetical characteristics occurs.

Ions from the source of electrolytically and/or photocatalytically treated water are fed through the outlet 9 to the jet 2; they can be fed alternatively to a side of the floating body 1. Eventually, a limited amount of chemical agents for destruction of anabaena is lead through the inlet 11 or a regulated amount of biological agents for destruction of anabaena is lead through the inlet 12 or a regulated amount of oxidation agents is lead through the inlet 13 into the jet 5. Eventually, other electrochemical source 8 is placed at the inlet of the jet 2.

As it is evident in FIG. 2, at this alternative embodiment an ejector channel 10 passes through inside the floating body 1; behind the channel a deflector 4 is placed in which electrochemical sources 6 are fixed and on the outlet of the channel an electrochemical source 7 eventually a regulated inlet of air 14, is placed.

As it is evident in FIG. 3, at another alternative embodiment of the device for generation of correction media for water treatment in tanks, an outlet of electrolytically and/or photocatalytically treated water 9, an inlet of chemical agents 11, an inlet of biological agents 12 and an inlet of oxidation agents 13 lead behind the jet 2, between electrochemical sources 6.

Generation of ion network is schematically plotted in FIG. 4. The ion network is formed by treated water flowing through a jet, or more precisely through an ejector, and influenced by an outlet product from electrochemical sources. Behind the floating body 1, in this case a water craft, in the phase I, laying of an ion network coming out from the craft and, at the same time, influencing affected anabaena by interference of their slime layer, eventually their plasmatic membrane, occurs. They drop to the ground as a result of the change of the electrical potential, see the phase II. In this phase, electrocoagulation occurs at the same time. In the phase III, laying of an ion network to the ground of the water tank occurs. If in the next phase IV whirling of surface of sediment occurs, e.g. due to aquatic animals or water courses, repeated activity of ion network and thus an extension of the effect of the intervention occurs.

The device for generation of ion network according to this invention is arranged on a floating body and it is possible to use its activity both at a motion of the floating body and also when the body is docked and streaming of water in an ejector jet is activated.

The invention claimed is:

1. A device for generation of an ion network for water treatment in tanks, wherein the device is arranged on a floating body and comprises:
   a drive mounted on the floating body and operative to initiate mutual motion of the floating body and water, the drive comprising an ejector and a jet, the ejector operative to eject water at a higher speed through the jet, the jet including a shaped discharge end disposed to direct ejected water outside of the floating body at a lower speed;
   at least one source of electrolytically and/or photocatalytically treated water, the source connected to an outlet disposed to feed treated water from the source into the jet or into ejected water from the ejector; and
   at least one electrochemical source disposed outside the jet and downstream of the shaped discharge end to feed ions from the electrochemical source into ejected water from the ejector and treated water from the source of electrolytically and/or photocatalytically treated water.

2. A device for generation of an ion network for water treatment in tanks, according to claim 1, wherein the electrolytically and/or photocatalytically treated water is a catholyte and/or an anolyte.

3. A device for generation of an ion network, according to claim 1, wherein the outlet that is connected to the at least one electrolytically and/or photocatalytically treated water source is disposed outside of the jet and downstream of the shaped discharge end to feed treated water from the source into ejected water from the ejector.

4. A device for generation of an ion network, according to claim 1, wherein an ejector deflector is arranged at sides of the jet.

5. A device for generation of an ion network, according to claim 1, wherein there is an aerosol deflector arranged behind the jet.

6. A device for generation of an ion network, according to claim 1, wherein an inlet of chemical agents and/or an inlet of biological agents leads into the jet and/or into ejected water from the ejector.

7. A device for generation of an ion network, according to claim 1, wherein an inlet of oxidation agents leads into the jet and/or into ejected water from the ejector.

8. A device for generation of an ion network, according to claim 1, wherein an inlet of air leads into the ejector.

9. A device for generation of ion network, according to claim 2, wherein the electrolytically and/or photocatalytically treated water source is arranged in a channel of a jet in the ejector;

there is an ejector deflector arranged at sides of the jet;

there is an aerosol deflector arranged behind the jet;

an inlet of chemical agents and/or an inlet of biological agent leads into ejection and/or ejected water of the ejector;

an inlet of oxidation agent leads into ejection and/or ejected water of the ejector; and an inlet of air leads into the ejector.

* * * * *